United States Patent Office 3,004,993
Patented Oct. 17, 1961

3,004,993
17β-METHYL-20-KETO-18-NOR-17α-PREGNENES AND PROCESS THEREFOR
Albert Wettstein and Karl Heusler, Basel, Switzerland, assignors to Ciba Pharmaceutical Products Inc., Summit, N.J.
No Drawing. Filed July 8, 1955, Ser. No. 520,910
Claims priority, application Switzerland July 16, 1954
16 Claims. (Cl. 260—397.45)

This invention relates to a new series of organic compounds. More particularly, this invention is concerned with 17β-methyl-20-keto-18-nor-17α-pregnenes containing a double bond starting from the 13-carbon atom and which are oxygenated in the 16-position, their functional derivatives and methods for their preparation.

The process consists in reacting a 16,17α-oxido-20-keto-pregnane compound with an acylating agent in the presence of an acid catalyst, and if desired, treating the product with a hydrolyzing and oxidizing agent and/or functionally converting hydroxyl or keto groups and/or saturating any hydrogenatable double bonds that may be present.

The reaction taking place by the action of an acylating agent in the presence of an acid catalyst may be illustrated in the case of 16,17α-oxido-pregnenolone acetate, as follows:

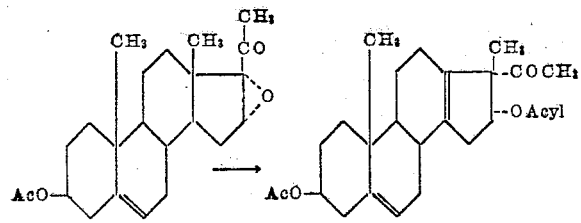

As acylating agents there are suitable strong acylating agents especially reactive derivatives of aliphatic carboxylic acids, such as their anhydrides or halides, and, if desired, mixtures thereof, such as acetic anhydride, propionic anhydride, butyric anhydride, isobutyric anhydride or the corresponding acid chlorides or bromides, but also the especially strong free carboxylic acids of the aliphatic series, such as formic acid or halogen-acetic acids, especially trifluoracetic acid. It is of advantage to use the acylating agent as a solvent, but it is also possible to work with the addition of an inert diluent, such as a hydrocarbon, for example, toluene, or a halogenated hydrocarbon. As acid catalysts there may be used, for example, anhydrous mineral acids, sulfonic acids or acid salts, for example, zinc chloride, ferric chloride and the like. The reaction may be carried out at any temperature between —20° C. and 200° C. A suitable reaction rate is ordinarily obtained already at 15-25° C. when strong carboxylic acids are used as acylating agents; however when acid anhydrides are used it is preferred to work at higher temperatures, e.g. at the boiling point of the anhydride.

The 16,17α-oxido-20-keto pregnane compounds used as starting materials may be substituted in the nucleus or in the side chain, for example, in the 3-, 5-, 6-, 11-, 12- and/or 21-position by free or functionally converted hydroxyl or keto groups, such as acyloxy, for example, formyloxy, trifluoracetoxy, acetoxy, propionyloxy, benzoyloxy or tosyloxy groups, by alkoxy, for example, methoxy or ethoxy groups, or by acetalized keto groups. The starting materials may have any desired configuration and may also contain double bonds, for example, in the 4-, 5-, 9(11)- and/or 11-position.

The double bond formed as a result of the rearrangement is in the 13,14-position. Starting from 11-keto-compounds, 12,13-unsaturated compounds can also be formed.

The new 17β-methyl-20-keto-18-nor-17α-pregnenes of the invention are useful as intermediate products for making therapeutically valuable compounds, for example, for the production of 18-nor-D-homo-steroids. For example 18-nor-D-homoandrostane-3,17α-dione (I) and Δ⁴-18-nor-D-homoandrostene-3,17α-dione (II) are especially valuable compounds. Compound I shows a high androgenic activity comparable to the known hormone androstane-3,17-dione. Compound II is even slightly more potent as an androgen than I and has a myotropic activity equal to or slightly higher than that of androstan-3,17-dione. These new 18-nor-D-homosteroids are thus valuable substitutes for the natural hormones. These new hormones may thus be applied in the treatment of the diseases and under the conditions where the hitherto known androgenic hormones have been used.

The transformation of the Δ⁵,¹³-3β,16α-diacetoxy-17β-methyl-20-keto-18-nor-17α-pregnadiene into a therapeutically active 18-nor-D-homo-steroid can be carried out, for example, as follows:

The oxime of the aforesaid compound is subjected in solution in pyridine to the Beckmann rearrangement by treatment with p-acetylaminobenzene sulfonic acid chloride and the resulting amide is hydrolyzed by boiling for 4 hours in aqueous methanolic potassium hydroxide solution in an atmosphere of nitrogen. There is obtained a Δ⁵,¹³-3β,16α-dihydroxy-17β-methyl-17α-amino-androstadiene, which yields a keto-aldehyde upon treatment with periodic acid in aqueous methanol.

From this compound there is obtained by the action of potassium tertiary butylate in tertiary butanol Δ⁵,¹³,¹⁵,¹⁷-3β,17α-dihydroxy-18-nor-D-homo-androstatetraene. By reduction of the 17α-methyl ether with lithium and alcohol in liquid ammonia followed by reduction of the crude product with a palladium catalyst, there is obtained Δ⁵-3β-oxy-17α-keto-18-nor-D-homo-androstene, which can be oxidized to the corresponding Δ⁴-3-ketone by the method of Oppenauer using benzene as a solvent and cyclohexanone and aluminum isopropoxide as an oxidizing agent. This compound and also the 4,5-saturated compound exhibits a strong androgenic action.

These reactions may be illustrated as follows:

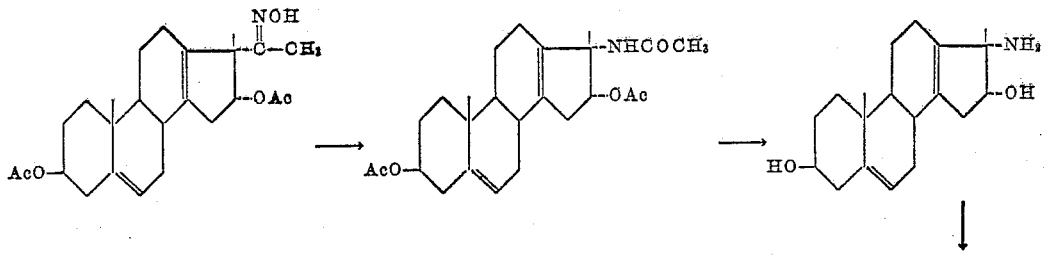

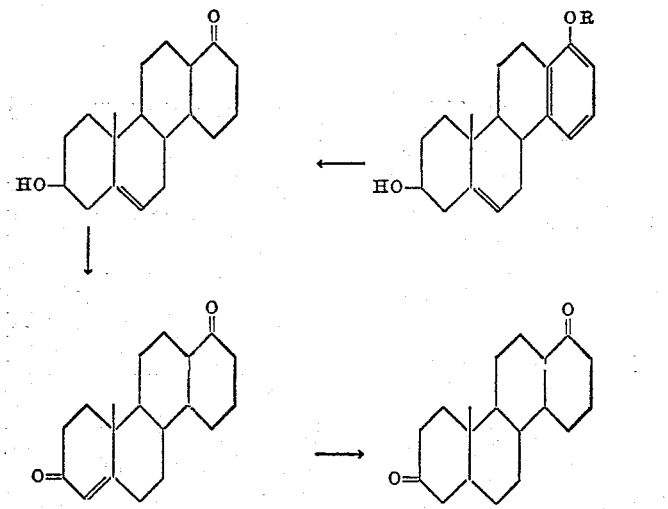

In a completely analogous manner other 17β-methyl-20-keto-18-nor-17α-pregnane compounds with a double bond extending from carbon atom 13 can be degraded to 18-nor-D-homo-androstane compounds. In a 17β-methyl-20-keto-18-nor-17α-pregnene having a free keto group in 3-position this keto group is advantageously protected during oximation and reduction by the formation of an ethylene ketal. This protection is effected by boiling the 3-keto-compound in benzene solution for several hours with methyl ethyl-dioxolane in the presence of a trace of p-toluene sulfonic acid and distilling off the methyl ethyl ketone formed by the exchange dioxolanation. The ethylene ketal is split by heating the product with dilute acetic acid at 90° C. for one hour. Keto groups in the ring C of the 18-nor-D-homo-androstanes obtained may be reductively eliminated in known manner, e.g. by Wolff-Kishner reduction.

The following examples illustrate the invention:

Example 1

5.0 grams of 16,17α-oxido-pregnenolone acetate are boiled under reflux in 200 cc. of acetic anhydride, containing 0.5 gram of paratoluene sulfonic acid monohydrate, for 3 hours at a bath temperature of 170° C. with the exclusion of moisture by means of a calcium chloride tube. 0.5 gram of anhydrous potassium acetate is then added, and the red-brown solution is evaporated to dryness under reduced pressure. The residue is taken up in 250 cc. of methylene chloride, and the solution is washed with water, sodium hydrogen carbonate solution and water, dried and evaporated. The semi-solid residue crystallizes from ether. The yield amounts to 3.02 grams. The pure $\Delta^{5,13}$-3β,16α-diacetoxy-17β-methyl-18-nor-20-keto-17α-pregnadiene obtained by recrystallization from acetone and ethyl acetate melts at 213–214.5° C. It has the specific rotation $[\alpha]_D^{26} = -10° \pm 4°$ (c.=1.010 in chloroform). The compound exhibits in the ultraviolet spectrum at 295 mμ a distinct absorption maximum (ε=180).

400 milligrams of this compound are boiled under reflux with 400 milligrams of semicarbazide hydrochloride in a mixture of 8 cc. of alcohol and 0.4 cc. of pyridine for 90 minutes. The mixture is then concentrated under reduced pressure to about 1 cc., then mixed with water, filtered with suction, and the filter residue is washed well with water. There are obtained 450 mg. of the semicarbazone, which melts at 238–240° C. (under reduced pressure with decomposition) after being recrystallized twice from a mixture of methylene chloride and methanol. It has the specific rotation $[\alpha]_D^{24} = -69° \pm 4°$ (c.= 0.668 in chloroform).

The oxime prepared in an analogous manner melts at 230–232° C. (under reduced pressure) after recrystallization from a mixture of methylene chloride and methanol. It has the specific rotation $$[\alpha]_D^{21} = -117° \pm 4°$$

(c.=0.415 in chloroform).

500 milligrams of $\Delta^{5,13}$-3β,16α-diacetoxy-17β-methyl-18-nor-20-keto-17α-pregnadiene melting at 213–214° C. are suspended in 10 cc. of methanol, then mixed with a solution of 250 milligrams of potassium hydroxide in 2.5 cc. of methanol and 2.5 cc. of water, and stirred until a clear solution is obtained. The whole is then allowed to stand for a further 40 minutes at room temperature. It is then acidified with 0.2 cc. of glacial acetic acid, precipitated with 150 cc. of water, the precipitate is taken up in benzene, and the aqueous solution is also extracted with benzene. The benzene solutions are washed with sodium carbonate solution and water, dried and evaporated. There are obtained 405 milligrams of $\Delta^{5,13}$-3β,16α-dihydroxy-17-methyl-18-nor-20-keto-17-pregnadiene, which melts at 189–191° C. after recrystallization from acetone and aqueous methanol. It has the specific rotation $[\alpha]_D^{23} = -131° \pm 4°$ (c.=0.613 in chloroform). It exhibits an ultraviolet maximum at 295 mμ (ε=180). By hydrolyzing 500 milligrams of the above diacetate in 60 cc. of alcohol with 10 cc. of concentrated hydrochloric acid, and working up in an analogous manner, there are obtained 385 milligrams of the above described diol melting at 189–191° C.

Example 2

25 milligrams of platinum oxide are pre-hydrogenated in 20 cc. of glacial acetic acid. There are then added 100 milligrams of $\Delta^{5,13}$-3β,16α-diacetoxy-17β-methyl-18-nor-20-keto-17α-pregnadiene melting at 213–214° C., and the whole is stirred under hydrogen at room temperature until after about one hour the absorption of hydrogen ceases. A total of 5.8 cc. of hydrogen (760 mm. at 0° C.) are taken up (calculated for one molar equivalent=5.4 cc.). The solution is filtered to remove the catalyst, and is evaporated under reduced pressure. It yields 100 milligrams of crystalline $\Delta^{13}$-3β,16α-diacetoxy-17β-methyl-18-nor-20-keto-17α-allopregnene, which melts at 187–188° C. after recrystallization from methanol. It has the specific rotation $$[\alpha]_D^{24} = +109° \pm 4°$$

(c.=0.330 in chloroform). It exhibits a pale yellow coloration with tetranitromethane.

500 milligrams of this diacetate are hydrolyzed with a methanolic solution of caustic potash as described in Example 1. The product dissolves in 20 minutes. By working up there are obtained 380 milligrams of crystalline $\Delta^{13}$ - $3\beta,16\alpha$ - dihydroxy - $17\beta$ - methyl - 18 - nor-20-keto-$17\alpha$-allopregnene, which melts at 211–213° C. after recrystallization from acetone. It has the specific rotation $[\alpha]_D^{24} = +73° \pm 4°$ (c.=0.517 in chloroform).

*Example 3*

2.0 grams of 16,17$\alpha$-oxido-pregnenolone acetate are dissolved in 40 cc. of formic acid of 99 percent strength, and, after the addition of 2.0 cc. of a mixture of 5 cc. of formic acid and 1.5 cc. of concentrated sulfuric acid, the whole is allowed to stand for 6 hours at room temperature. It is then poured on to 200 cc. of water, extracted with ether, and the ethereal extract is washed with water, sodium hydrogen carbonate solution and water, dried and evaporated. From the oily yellow residue there are obtained by crystallization from methanol 910 milligrams of $\Delta^{5,13}$-$3\beta$-acetoxy-$16\alpha$-formyloxy-18-nor-$17\beta$-methyl-20-keto-$17\alpha$-pregnadien, which melts at 163.5–164.5° C. after recrystallization from methanol. It has the specific rotation $[\alpha]_D^{24} = -150° \pm 4°$ (c.=0.776 in chloroform).

150 milligrams of this compound are hydrolyzed under nitrogen for 18 hours with 120 milligrams of potassium carbonate in a mixture of 10 cc. of methanol and 1.5 cc. of water at room temperature. By working up in the usual manner there are obtained 120 milligrams of crystalline $\Delta^{5,13}$-$3\beta,16\alpha$-dihydroxy-$17\beta$-methyl-18-nor-20-keto-$17\alpha$-pregnadiene melting at 179–181° C., which is identical with the product described in Example 1.

*Example 4*

700 milligrams of 16,17-oxido-progesterone are boiled under reflux for 3 hours with a solution of 100 milligrams of paratoluene sulfonic acid monohydrate in 15 cc. of acetic anhydride. The reaction mixture is worked up as described in Example 1. There are obtained 1.07 grams of a brown-red oil, from which 130 milligrams of $\Delta^{3,5,13}$-3,16$\alpha$-diacetoxy - 20 - keto-$17\beta$-methyl-18-nor-$17\alpha$-pregnatriene melting at 163–166° C. are isolated by crystallization from methanol and ether.

By hydrolyzing the product with potassium carbonate in aqueous methanol at room temperature there is obtained the pure $\Delta^{4,13}$-3,20-diketo-16$\alpha$-hydroxy-18-nor-$17\beta$-methyl-$17\alpha$-pregnadiene.

*Example 5*

2.0 grams of 3$\beta$-acetoxy-12,20-diketo-16,17$\alpha$-oxido-allopregnane (prepared in known manner by oxidation of $\Delta^{16}$-3$\beta$-acetoxy-12,20-diketo-allopregnene with hydrogen peroxide in aqueous methanolic potassium hydroxide solution and acetylation of the crude product) are boiled for 2½ hours at a bath temperature of 170° C. in 100 cc. of acetic anhydride to which 0.2 gram of para-toluene sulfonic acid monohydrate has been added. 0.2 gram of potassium acetate is added to the dark red-brown solution which is then evaporated to dryness under reduced pressure. The residue is dissolved in methylene chloride, and the solution washed with water, sodium bicarbonate solution and water, dried and evaporated. From the residue there is obtained by crystallization from acetone, 0.9 gram of $\Delta^{13}$-3$\beta$,16$\alpha$-diacetoxy-12,20-diketo-17$\beta$-methyl-18-nor-17$\alpha$-allopregnene, which in the ultraviolet spectrum shows a distinct maximum at 295 m$\mu$ ($\epsilon$=205).

By hydrolysis with methanolic potassium hydroxide solution at room temperature, the corresponding 3$\beta$-16$\alpha$-dihydroxy compound is obtained.

In quite an analogous manner, the 3$\alpha$-21-diacetoxy-11,20-diketo-16,17$\alpha$-oxido-pregnane, on treatment with acetic anhydride to which some para-toluene sulfonic acid has been added, yields the $\Delta^{12}$-3$\alpha$,16$\alpha$,21-triacetoxy-11,20-diketo-17$\beta$-methyl-18-nor-17$\alpha$-pregnene.

*Example 6*

2.5 grams of 3$\beta$-acetoxy-11,20-diketo-16,17$\alpha$-oxido-allopregnene are dissolved in 50 cc. of 99% formic acid and allowed to stand at room temperature for 6 hours with a mixture of 3 cc. of formic acid and 0.6 cc. of concentrated sulfuric acid. The whole is then poured into 300 cc. of water and then extracted several times with chloroform. The chloroform extracts are washed with water, sodium bicarbonate solution and water, dried and evaporated. From the oily residue there is obtained by crystallization from methanol to which some ether has been added 0.8 gram of the $\Delta^{12}$-3$\beta$-acetoxy-11,20-diketo-16$\alpha$-formyloxy-17$\beta$-methyl-18-nor-17$\alpha$-allopregnene.

When a solution of 0.2 gram of this compound in 70 cc. of a 1:1 mixture of dioxane and water is treated for 12 hours at room temperature with 0.5 gram of potassium hydroxide and the whole then extracted with much chloroform, there is obtained after drying and evaporating the chloroform solution a solid residue which consists of nearly pure $\Delta^{12}$-3$\beta$,16$\alpha$-dihydroxy-11,20-diketo-17$\beta$-methyl-18-nor-17$\alpha$-allopregnene.

What is claimed is:

1. The new compound $\Delta^{5,13}$-3$\beta$,16$\alpha$-diacetoxy-17$\beta$-methyl-20-keto-18-nor-17$\alpha$-pregnadiene.

2. The new compound $\Delta^{5,13}$-3$\beta$-acetoxy-16$\alpha$-formyloxy-17$\beta$-methyl-20-keto-18-nor-17$\alpha$-pregnadiene.

3. The new compound $\Delta^{3,5\ 13}$-3,16$\alpha$-diacetoxy-20-keto-17$\beta$-methyl-18-nor-17$\alpha$-pregnatriene.

4. The new compound $\Delta^{13}$-3$\beta$,16$\alpha$-diacetoxy-12,20-diketo-17$\beta$-methyl-18-nor-17$\alpha$-allopregnene.

5. The new compound $\Delta^{12}$-3$\beta$-acetoxy-11,20-diketo-16$\alpha$-formyloxy-17$\beta$-methyl-18-nor-17$\alpha$-allopregnene.

6. A method for preparing a member selected from the group consisting of compounds of the formulae

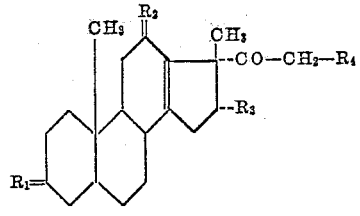

and

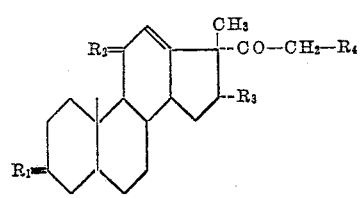

their 5$\beta$-isomers, and 4.5- and 5,6-double bonded derivatives in which formulae $R_1$ stands for a member selected from the group consisting of an oxo group, an acetalized oxo group, a free hydroxyl group together with a hydrogen atom, a hydroxyl group esterified with a lower aliphatic carboxylic acid having from 1 to 4 carbon atoms together with a hydrogen atom, $R_2$ stands for a member selected from the group consisting of two hydrogen atoms and an oxo group, $R_3$ for a member selected from the group consisting of a hydroxyl group, a hydroxyl group esterified with a lower aliphatic carboxylic acid having 1 to 4 carbon atoms and $R_4$ for a member selected from the group consisting of hydrogen and a hydroxyl group esterified with a lower aliphatic carboxylic acid having from 1 to 4 carbon atoms which comprises the step of treating the corresponding 16,17$\alpha$-oxido-20-keto-steroid with a lower aliphatic acylating agent having 1 to 4 carbon atoms in the presence of an acid catalyst.

7. A method as set forth in claim 6 wherein the acylating agent is an aliphatic carboxylic acid anhydride.

8. A method as set forth in claim 6 wherein the acylating agent is formic acid.

9. A method as set forth in claim 6 wherein the acylating agent is an aliphatic carboxylic acid halide 10. A method as set forth in claim 6 wherein the acylating agent is trifluoracetic acid.

11. A method as set forth in claim 6 wherein the acid catalyst is a mineral acid.

12. A method as set forth in claim 6 wherein the acid catalyst is paratoluene sulfonic acid.

13. The oxime of $\Delta^{5,13}$-3$\beta$,16$\alpha$-diacetoxy-17$\beta$-methyl-18-nor-20-keto-17$\alpha$-pregnadiene.

14. A process which comprises treating $\Delta^{5,13}$-3$\beta$,16$\alpha$-diacetoxy - 17$\beta$ - methyl-18-nor-20-keto-17$\alpha$-pregnadiene with a hydrolizing agent.

15. The new compound $\Delta^{5,13}$-3$\beta$,16$\alpha$-dihydroxy-17$\beta$-methyl-18-nor-20-keto-17$\alpha$-pregnadien.

16. A member selected from the group consisting of compounds of the formulae

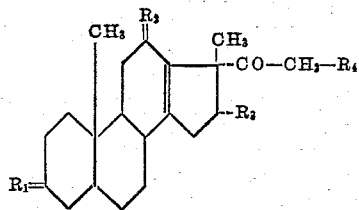

and

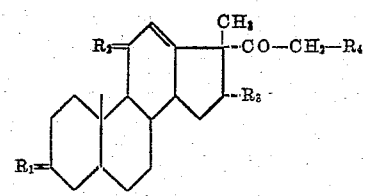

their 5$\beta$-isomers, and 4,5- and 5,6-double bonded derivatives in which formulae $R_1$ stands for a member selected from the group consisting of an oxo group, an acetalized oxo group, a free hydroxyl group together with a hydrogen atom, a hydroxyl group esterified with a lower aliphatic carboxylic acid having from 1 to 4 carbon atoms together with a hydrogen atom, $R_2$ stands for a member selected from the group consisting of two hydrogen atoms and an oxo group, $R_3$ for a member selected from the group consisting of a hydroxyl group, a hydroxyl group esterified with a lower aliphatic carboxylic acid having 1 to 4 carbon atoms and $R_4$ for a member selected from the group consisting of hydrogen and a hydroxyl group esterified with a lower aliphatic carboxylic acid having from 1 to 4 carbon atoms.

References Cited in the file of this patent

Magrath: J. Chemical Soc.; London (1950), pages 2393–2396.

Heusler et al.: Chem. Ber., vol. 87 (1954), pages 1301–1312.